United States Patent Office 3,391,114
Patented July 2, 1968

3,391,114
HOMOPOLYMERS AND COPOLYMERS OF 5- OR 7 - ACRYLAMIDOMETHYLENE - 8 - HYDROXYQUINOLINE AND METAL COMPLEXES THEREOF
Paul Schaefer, Riehen, Helmut Huber-Emden, Basel, Hans-Rudolf Hitz, Muttenz, and Arthur Maeder, Therwil, Switzerland, assignors to Ciba Limited, Basel, Switzerland, a company of Switzerland
No Drawing. Filed Dec. 19, 1966, Ser. No. 602,513
Claims priority, application Switzerland, Dec. 23, 1965, 17,733/65
8 Claims. (Cl. 260—47)

ABSTRACT OF THE DISCLOSURE

The present invention provides new homo- and copolymers from 8-hydroxyquinolines or metal complex compounds thereof with an at most divalent complex forming cation. At least one residue of an N-methylamide of an ethylenically unsaturated polymerizable acid is bound by the carbon atom of its methylamide group to a cyclic carbon atom of said 8-hydroxyquinolines. These 8- hydroxyquinolies are homo-polymerized or copolymerized with other copolymerizable, ethylenically unsaturated compounds to form polymers of a mean molecular weight within the range of 4000 to 20,000. The polymers and their metal complexes have an antimicrobial effect, mainly against bacteria and fungi.

---

The present invention provides new polymers or metal complex compounds thereof with monovalent or divalent cations from (a) 8-hydroxyquinolines in which at least one residue of an N-methylamide of an ethylenically unsaturated polymerizable acid is bound by the carbon atom of its methylamide group to a cyclic carbon atom of an 8-hydroxyquinoline residue and, if desired,
(b) other copolymerizable, ethylenically unsaturated compounds.

In this group there are of special value the 8-hydroxyquinolines of the formula (1) 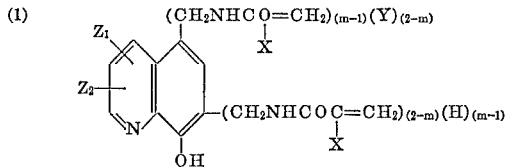

in which X represents a hydrogen atom, a methyl or an ethyl radical; Y represents a halogen atom or an alkyl radical with 1 to 4 carbon atoms; $Z_1$ and $Z_2$ each represents a hydrogen atom or an alkyl radical with 1 to 4 carbon atoms, and $m=1$ or 2.

Thus, in the 8-hydroxyquinolines of the Formula 1 the unsaturated N-methylamide residue is bound to the 8-hydroxyquinoline residue in position 5 or 7. They correspond to the formula (2) 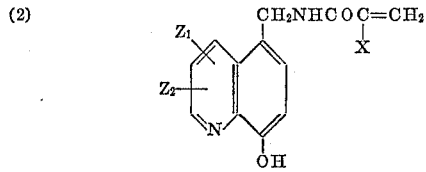

or (3) 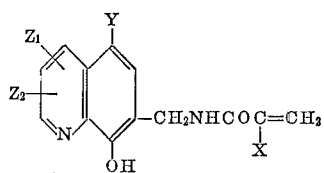

in which X, Y, $Z_1$ and $Z_2$ have the above meanings.

All these 8-hydroxyquinolines are accessible by known methods, by reacting a possibly etherified N-methylolamide of an ethylenically unsaturated polymerizable acid with a 8-hydroxyquinoline in an acid reaction medium.

Thus, depending on the starting materials chosen there may be obtained polymerizable 8-hydroxyquinolines of the Formula 2 or 3. As examples of N-methylolamides, or their alkyl ethers with 1 to 4 carbon atoms, concerned in the manufacture of the new 8-hydroxyquinolines there may be mentioned the N-methylolamides, or the alkyl ethers thereof, of the following polymerizable acids:

acrylic acid
methacrylic acid and
α-ethylacrylic acid

As examples of 8-hydroxyquinolines to be reacted with the N-methylolamides there may be mentioned:

8-hydroxyquinoline
5-chloro-8-hydroxyquinoline
5-methyl-8-hydroxyquinoline
2-methyl-8-hydroxyquinoline and
2,4-dimethyl-8-hydroxyquinoline The acid reaction medium is advantageously prepared by adding sulphuric acid. As a rule it is advisable to use as solvent concentrated sulphuric acid, preferably of 98% strength. The reaction mixture should contain as little water as possible and need generally not be heated; it suffices to leave it to itself for a prolonged period, for example for 20 to 100 hours, at 20° C. if possible with exclusion of air. It is also advantageous to add an inhibitor, for example thiodiphenylamine.

In this manner there are also obtained, for example, the following four preferred monomers:

(4) 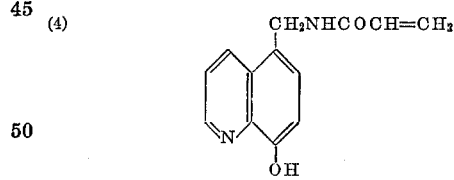

(5) 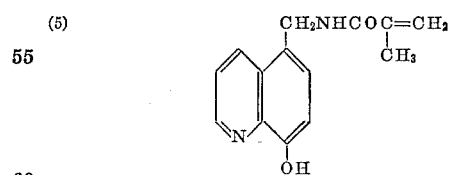

(6) 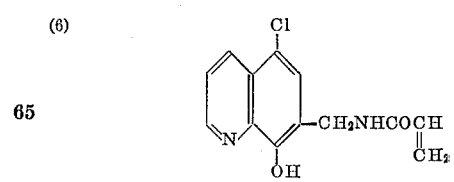

(7) 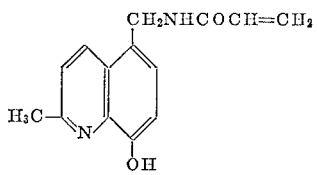

These new polymerizable 8-hydroxyquinolines are suitable for the manufacture of the polymers of this invention. They may be converted in solution, emulsion or without solvent [block polymerization] in the presence of a free-radical forming catalyst or an ionic catalyst with themselves or with other polymerizable compounds into generally linear polymers. Depending on the starting materials chosen, this procedure furnishes linear polymer homologues, unipolymers or multipolymers. Polymer homologues are obtained when a single 8-hydroxyquinoline is used, unipolymers when two or more disparate 8-hydroxyquinolines are used and multipolymers are formed when at least one 8-hydroxyquinoline and at least one other monomer are used. As examples of monomeric compounds suitable for the manufacture of multipolymers there may be mentioned: Vinyl esters of organic acids, for example the vinyl esters of acetic, formic, butyric or benzoic acid, Vinlyalkylketones such as vintylmethylketone, Vinylhalides such as vinylchloride, vinylfluoride and vinylidenechloride, Vinylaryl compounds such as styrene and substituted styrenes, for example α-methylstyrene, Other derivatives of polymerizable ethylenically unsaturated acids such as vinylpyrrolidone, vinylcarbazole, acrylonitrile, acrylamide, methacrylamide; amides substituted on the nitrogen atom by alkyl groups, such as ethyl, methyl, tertiary butyl or hydroxyalkyl groups, for example the N-methylolamides and their ethers, methylene-N-acrylamide-N′-methanesulphonamide; basic amides such as methacrylic acid dimethylaminomethylamide or acrylic acid diethylaminopropylamide and their quaternation products, and more especially esters of polymerizable ethylenically unsaturated acids, for example those of acrylic, methacrylic, crotonic, maleic, fumaric or itaconic acid, vinyl-, allyl- or styrenesulphonic acid and of monoalcohols or dialcohols with 1 to 18 carbon atoms or of hydroxybenzenes, for example methacrylic acid methyl ester, methacrylic acid-n-octadecyl ester, acrylic acid ethyl ester, acrylic acid glycidyl ester, acrylic acid butyl ester, acrylic acid-β-hydroxy-ethyl ester or the corresponding polyglycol esters, methacrylic acid-3-diethanolamino-2-hydroxypropyl ester or acrylic acid dodecyl ester; furthermore, also Free, ethylenically unsaturated acids such as acrylic, methcrylic, crotonic, itaconic, mtaleic, fumaric, vinylsulphonic, allylsulphonic and vinylbenzenesulphonic acid, Polymerizable olefines such as isobutylene, butadiene and 2-chlorobutadiene.

Polymers are preferably manufactured from an 8-hydroxyquinoline of the composition defined above and acrylamide, N-tertiary butylacrylamide, methacrylic acid-n - octadecyl ester; methacrylamide - N - methylolmethyl ether, methylene-N-acrylamide-N′-methanesulphonamide or methacrylic acid-dimethylamino-methylamide.

As a rule the polymers consist of 0.1 to 100% of an 8-hydroxyquinoline or of several such quinolines and 99.9% to 0% of at least one other polymerizable compound. Depending on the polymerization conditions chosen, the polymers are obtained in the form of a solution, a gel, an emulsion or a granulate. In general, the complete homopolymerization or copolymerization of the 8-hydroxyquinolines offers no difficulty, and the usual methods may be employed. The homopolymers and copolymers form films that adhere well to the support, such as glass or metal. The new 8-hydroxyquinolines can be rendered water-soluble by copolymerization with water-soluble monomers, for example acrylamide. When the hydrophilic component is at the same time self-crosslinking [Examples 3, 4, 5] the copolymers can be thermofixed on the fibre, for example on cellulose. By copolymerization with lipophilic monomers [for example methacrylic acid-n-octadecyl ester] there are obtained copolymers soluble e.g. in polyethylene, polypropylene, nylon and plasticizers. The mean molecular weights of the homopolymers and copolymers described above are within the range from 4,000 to 20,000.

The homopolymers and copolymers form metal complexes with many metal cations, for example with $Mg^{2+}$, $Ba^{2+}$, $Zn^{2+}$, $Cd^{2+}$, $Hg^{2+}$, $Sn^{2+}$, $Pb^{2+}$, $Fe^{2+}$, $Cu^{2+}$, $Ag^{1+}$, tributyl-$Sn^{1+}$ or phenyl-$Hg^{1+}$. The 2:1-complexes known from 8-hydroxyquinoline—when divalent metal cations are used—are formed also by the homopolymers and copolymers referred to above which, depending on the amount of metal cations added or on the degree of coordinative linking, undergo an increase in molecular weight and crosslinking. Crosslinking may be imagined to occur as follows:

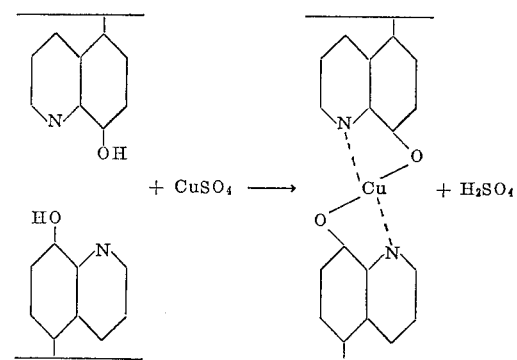

When the viscosities of, for example, a 20% aqueous solution of the copolymer described in Example 2 are measured as a function of an increasing addition of copper sulphate solution, there results at about 50% of the quantity $CuSO_4$ calculated for the quantitative formation of the 2:1-complex the highest viscosity, or the highest molecular weight respectively.

| | $CuSO_4$ solution of 10% strength in ml. | Viscosity in centipoises |
|---|---|---|
| For every 100 parts of 20% solution of copolymer of Example 2 in water. | 0 | 72.6 |
| | 1 | 134.5 |
| | 3 | 872.2 |
| | 4 | 214.2 |
| | 6 | 68.3 |
| | 8 | 46.9 |

The degree of complex formation and crosslinking can be increased by capturing the protons formed during the complex formation by a buffer substance such as sodium acetate. Thus, when $CuSO_4$ solution is added to a buffered solution of Example 2, the polymer settles out as a gel. The drop in viscosity, or in the molecular weight respectively (see table) on further addition of $CuSO_4$ solution suggests the presence of 1:1-complexes. Such 1:1-complexes can be prepared with monovalent complex-forming cations, for example the tributyltin cation or the phenylmercury cation (see Examples 26 to 30).

It is known that 8-hydroxyquinoline-metal complexes are used for producing antimicrobial dressings on textile materials, papers and leathers. The use of 8-hydroxyquinoline-metal complexes is rendered difficult by the sparing solubility of these complexes in water. It has already been proposed to apply the complexes to the fibre in an aqueous emulsion, in organic solvents or in solvent+water mixtures, and also with the aid of synthetic resins. According to another process a complex of the components is first formed on the fibre.

On the other hand, all homopolymers and copolymers of this invention, which have a protective effect similar to that just mentioned, have the advantage that they are readily soluble in water and are easy to fix on the fibre by the usual methods, for example by the exhaustion method on cotton. It is possible either to fix the metal-free polymeric complex former on the fibre and then to produce the complex on the fibre by subsequent treatment in an aqueous metal salt solution, or the fibre may be treated with an aqueous solution of the polymeric metal-complex which operation is followed by fixation. The biocidal effect may also be regenerated by a renewed treatment with metal salt solution. The meta-free copolymers fixed on the fibre likewise develop a biocidal activity.

It is also known that the metal complexes of 8-hydroxyquinoline are very suitable as antimicrobial additives to soaps, washing agents, plastics, paints and lacquers; furthermore insulating material is rendered rotproof by their addition. Similar protective effects can be achieved with the polymeric 8-hydroxyquinolines of this invention and with their metal complexes.

The disadvantages associated with all known processes is the poor solubility of the metal complexes in plastics, or their tendency to migrate in and bleed out of lacquers and paints. In contrast thereto the complex formers of this invention offer the advantage that they can be copolymerized with substrate-compatible monomers, whereby the solubility of the complexes in the plastics and lacquers is improved. Moreover, the polymeric character of the polymer complexes according to this invention inhibits rapid migration or their being washed out.

The polymerizable 8-hydroxyquinolines of this invention, polymerized with suitable comonomers, lend themselves well to incorporation in a migration-resistant manner in polypropylene and in this manner they promote the possibility of dyeing with metal complex dyestuffs. Suitable copolymers of these new monomers also lend themselves to the extraction of metal ions from solutions.

Unless otherwise indicated, parts and percentages in the following Manufacturing Instructions and examples are by weight. The relationship of parts by weight to parts by volume is the same as that between the gram and the millilitre.

MANUFACTURING INSTRUCTIONS

A. 145 parts of 8-hydroxyquinoline and 1 part of thiodiphenylamine are dissolved in 400 parts by volume of sulphuric acid of 98% strength at a temperature not exceeding 20° C. Then, likewise at a maximum temperature of 20° C., 101 parts of acrylic acid methylolamide are added in small portions and the batch is stirred until all has dissolved, whereupon it is kept in a closed vessel for 2 days. The batch is then poured over 2000 parts of ice and the precipitate is suctioned off, dissolved in 2500 parts of water and, while being cooled, rendered weakly acid with 400 parts by volume of sodium hydroxide solution of 30% strength and then completely alkaline by adding 340 parts by volume of 2 N-sodium carbonate solution. The precipitate formed is suctioned off and thoroughly washed with water, to yield 149 parts (=65% of theory) of the compound of the Formula 4.

After recrystallization from ethanol it melts at 199° C.
*Analysis.*—Found, percent: C, 68.4; H, 5.4; N, 12.1. Calculated, percent: C, 68.4; H, 5.3; N, 12.3.

B. 145 parts of 8-hydroxyquinoline and 1 part of thiodiphenylamine are dissolved in 500 parts by volume of sulphuric acid of 98% strength at a temperature not exceeding 20° C. Then, likewise at a maximum temperature of 20° C., 142 parts of methylolmethacrylamide-methyl ether are slowly added. The batch is kept for 2 days in a closed vessel and then stirred out over 2000 parts of ice. After a short time a yellow precipitate forms which after 30 minutes is suctioned off with ice-cooling, dissolved in 2500 parts of water, a small quantity of undissolved residue is filtered off, the filtrate is extensively buffered with sodium hydroxide solution of 30% strength, and then rendered completely alkaline with 2 N-sodium carbonate solution. The precipitate formed is suctioned off and thoroughly washed with water and dried, to yield 96 parts (=39.6% of theory) of the compound of the Formula 5, which after recrystallization from ethanol melts at 152 to 154° C.

*Analysis.*—Found, percent: C, 69.7; H, 5.9; N, 11.6. Calculated, percent: C, 69.4; H, 5.8; N, 11.6.

C. 71.6 parts of 5-chloro-8-hydroxyquinoline and 0.5 part of thiodiphenylamine are dissolved in 400 parts by volume of sulphuric acid of 98% strength at a temperature not exceeding 25° C. Then 40.4 parts of acrylic acid methylolamide are added in small portions at a temperature not exceeding 25° C. and the batch is stirred until all has dissolved and kept for 2 days in a closed vessel, then poured out over 2000 parts of ice and, while being cooled, rendered weakly acid with sodium hydroxide solution of 30% strength and then completely alkaline with 2 N-sodium carbonate solution. The precipitate formed is suctioned off and washed with water, then intimately stirred with 700 parts by volume of dimethylformamide, the undissolved matter is suctioned off, and 2500 parts of water are added to the filtrate, to yield as a precipitate 45.7 parts (=43.5% of theory) of the compound of the Formula 6 which, after recrystallization from xylene, melts at 198° C.

*Analysis.*—Found, percent: C, 59.6; H, 4.3; N, 10.4; Cl, 13.6. Calculated, percent: C, 59.4; H, 4.2; N, 10.7; Cl, 13.5.

D. 159.2 parts of 8-hydroxyquinaldine and 0.5 part of thiodiphenylamine are dissolved in 400 parts by volume of sulphuric acid of 98% strength not exceeding 20° C. Then, likewise at a maximum temperature of 20° C., 111 parts of acrylic acid methylolamide are added in small portions and the whole is stirred until all has dissolved, and the batch is then kept for 2 days in a closed vessel, then poured over 2000 parts of ice, and the resulting yellow precipitate is suctioned off and recrystallized from 1000 parts of water heated at 55° C. with addition of active carbon. The residue is then dissolved in 4000 parts of water of 45° C. and the solution is rendered distinctly alkaline with 2 N-sodium carbonate solution. The precipitate formed is suctioned off and thoroughly washed with water, to yield after drying 82.2 parts (=33.9% of theory) of the compound of the Formula 7 melting at 174 to 175° C. If necessary, it may be recrystallized from isopropanol.

*Analysis.*—Found, percent: C, 69.3; H, 6.1; N, 11.3. Calculated, percent: C, 69.4; H, 5.8; N, 11.6.

Example 1

A solution of 0.06 parts of azo-diisobutyronitrile in 2 parts of dimethylformamide is added at 75° C., while stirring and passing a current of nitrogen, into a solution of 3.75 parts of the compound of the Formula 4 and 8.25 parts of acrylamide in 61 parts of dimethylformamide. After 30 minutes a solution of 0.06 part of azo-diisobutyronitrile in 2 parts of dimethylformamide is added, and after another 30 minutes a solution of 0.12 part of azo-diisobutyronitrile in 4 parts of dimethylformamide. After 12 hours the copolymer is quantitatively precipitated out of the cooled mixture with 200 parts by volume of ether, suctioned off, washed with ether and dried, to yield 12 parts of a yellowish, film-forming copolymer which can be dissolved in water with the aid of alkali metal hydroxides or acids, such as formic or acetic or a mineral acid.

Example 2

The polymerization as described in Example 1 of 13.5 parts of acrylamide and 1.5 parts of the compound of the Formula 4 furnishes 14.5 parts of a faintly yellowish, film-forming copolymer that is soluble in water.

Example 3

A solution of 0.2 part of 2-ethylhexylic acid butyl perester in 1 part of dimethylformamide is added at 65° C.

with stirring and while passing a current of nitrogen to a solution of 4.56 parts of the compound of the Formula 4 and 5.16 parts of methacrylamide-N-methylolmethyl ether in 16 parts of dimethylformamide, and the whole is heated to 80° C. After 30 minutes, a solution of 0.2 part of 2-ethylhexylic acid-tertiary butyl perester in 1 part of dimethylformamide is added and after another 60 minutes once more a solution of 0.2 part of 2-ethylhexylic acid-tertiary butyl perester in 1 part of dimethylformamide. The batch is further polymerized for 6 hours, the solution concentrated under vacuum, and there are obtained 9 parts of a yellowish, film-forming copolymer which can be dissolved in water with the aid of an alkali metal hydroxide or an acid, for example formic acid.

Example 4

A solution of 4.56 parts of the compound of the Formula 4 and 7.12 parts of methylene-N-acrylamide-N'-methanesulphonamide of the formula (8) $CH_2=CH-CO-NH-CH_2-NH-SO_2-CH_3$

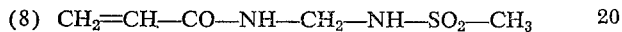

in 33 parts of dimethylformamide is mixed at 75° C. with stirring and while passing a current of nitrogen with a solution of 0.04 part of azo-diisobutyronitrile in 2 parts of dimethylformamide. After 30 minutes and 60 minutes each a solution of 0.04 part of azo-diisobutyronitrile in 2 parts of dimethylformamide is added, and the whole is heated for 10 hours at 75° C. Concentration of the solution under vacuum furnishes 9 parts of a yellowish, film-forming copolymer which can be dissolved in water with the aid of an alkali metal hydroxide or an acid.

Example 5

A solution of 8.8 parts of the compound of the Formula 4 and 11.2 parts of methacrylic acid dimethylaminomethylamide of the formula (9)

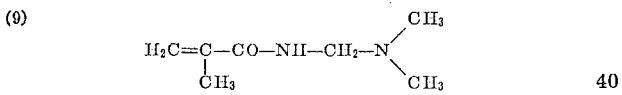

in 92 parts of dimethylformamide is mixed at 65° C. with 0.08 part of azo-diisobutyronitrile with stirring and while passing a current of nitrogen. After 30 minutes 0.08 part of azo-diisobutyronitrile and after another 30 minutes 0.16 part of azo-diisobutyronitrile are added and the batch is heated for 34 hours at 65° C. The copolymer is precipitated with 300 parts by volume of ether, suctioned off, washed and dried, to yield 19 parts of a yellowish, film-forming resin which is soluble in water with the aid of an acid.

Example 6

A solution of 11 parts of the compound of the Formula 4 and 17 parts of methacrylic acid-n-octadecyl ester in 60 parts of dimethylformamide and 30 parts of benzene is mixed at 72° C. with a solution of 0.6 part of azo-diisobutyronitrile in 4 parts of dimethylformamide. The temperature is raised to 90° C., and a solution of 0.2 part of azo-diisobutyronitrile in 4 parts of dimethylformamide is added. After 10 hours, benzene is distilled off under vacuum. The resin is precipitated from the dimethylformamide solution by means of water, suctioned off, washed and dried. Yield: 26 parts.

Example 7

A solution of 6 parts of the compound of the Formula 4 and 14 parts of N-tertiary butylacrylamide in 60 parts of dimethylformamide is mixed at 75° C. with a solution of 0.12 part of azo-diisobutyronitrile in 4 parts of dimethylformamide. After 30 and 60 minutes each a solution of 0.12 part of azo-diisobutyronitrile in 4 parts of dimethylformamide is added and the whole is heated for 12 hours at 75° C. The copolymer is precipitated with water, suctioned off, washed with water and dried. Yield: 19.5 parts.

Example 8

A solution of 5.5 parts of the compound of the Formula 5 and 8.5 parts of methacrylic acid-n-octadecyl ester in 30 parts of benzene and 5 parts of dimethylformamide is mixed at 75° C., while stirring and passing nitrogen, with a solution of 0.3 part of 2-ethylhexylic acid-tertiary butyl perester in 2 parts of benzene. Three hours later, another solution of 0.1 part of 2-ethylhexylic acid-tertiary butyl perester in 2 parts of benzene is added and the temperature is raised to 85° C. After a further 12 hours the solvent is distilled off, to yield 13 parts of the copolymer which forms a clear, yellowish film.

Example 9

9 parts of acrylamide and 3 parts of the compound of the Formula 6 are polymerized by the process described in Example 1. The copolymer can be dissolved in water with the aid of an acid or an alkali metal hydroxide. Yield: 5 parts.

Example 10

When 9.6 parts of the compound of the Formula 6 are polymerized with 11.4 parts of the compound of the Formula 9 as described in Example 5, 18 parts of a copolymer are obtained which can be dissolved in water with the aid of an acid.

Example 11

While stirring and passing a current of nitrogen, a solution of 2.3 parts of the compound of the Formula 4 and 2.2 parts of acrylic acid in 9 parts of dimethylformamide is mixed at 75° C. with a solution of 0.02 part of azo-diisobutyronitrile in 1 part of dimethylformamide. In the course of 60 minutes a solution of 0.06 part of azo-diisobutyronitrile in 2 parts of dimethylformamide is added in two portions and the solution is heated for 6 hours at 75° C. The copolymer is precipitated with water, suctioned off, washed and dried; it forms a clear, brittle film. Yield: 4.2 parts.

Example 12

When 2 parts of the compound of the Formula 4 are polymerized with 3 parts of vinylmethylketone in 15 parts of dimethylformamide as described in Example 11, and the solution is mixed within 60 hours with a solution of 0.18 part of azo-diisobutyronitrile in 6 parts of dimethylformamide in 6 portions and the solvent is distilled off under vacuum, 4.4 parts of a yellowish copolymer are obtained.

Example 13

A solution of 5 parts of the compound of the Formula 4 and 5 parts of methacrylic acid-n-butyl ester in 30 parts of benzene and 16.5 parts of dimethylformamide is mixed at 85° C., while stirring and passing a current of nitrogen, with a solution of 0.1 part of 2-ethylhexylic acid-tertiary butyl perester in 2 parts of benzene. After 2 hours another solution of 0.1 part of 2-ethylhexylic acid-tertiary butyl perester is added and the whole is heated for 12 hours at 85° C. After having distilled off the solvents there are obtained 9 parts of a copolymer which forms a clear, colourless film.

Example 14

5 parts of the compound of the Formula 4 are polymerized with 5 parts of methacrylic acid methyl ester by the process described in Example 13, to yield a copolymer which forms a clear, colourless film. Yield: 8.7 parts.

Example 15

A solution of 5 parts of the compound of the Formula 4, 4.5 parts of the compound of the Formula 9 and 0.5 part of methacrylamide-N-methylolmethyl ether in 30 parts of dimethylformamide is mixed at 65° C., while stirring and passing a current of nitrogen, with a solution of 0.04 part of azo-diisobutyronitrile in 2 parts of dimethylformamide. Within 60 minutes a solution of 0.08 part of azo-diisobutyronitrile in 4 parts of dimethylformamide is added in two portions and the solution is heated for 20 hours at 65° C. The copolymer is precipitated with 200 parts of ether, suctioned off, washed and dried, to yield 9.6 parts of a film-forming copolymer which can be dissolved in water with the aid of a dilute acid.

Example 16

When in the process of Example 15 the compound of the Formula 4 is replaced by 5 parts of the compound of the Formula 7, a film-forming copolymer is likewise obtained.

Example 17

By polymerizing as described in Example 15 4 parts of the compound of the Formula 4 with 6 parts of the compound of the formula

(10) 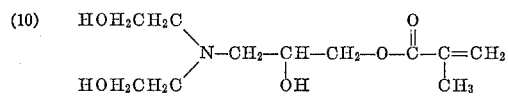

in 33 parts of dimethylformamide and 5 parts of water by means of a solution of 1.5 parts of azo-diisobutyronitrile in 4 parts of dimethylformamide and heating this solution for 34 hours at 65° C., followed by precipitation with ether, there are obtained 9.3 parts of a film-forming water-soluble copolymer.

Example 18

By polymerizing as described in Example 15 0.5 part of the compound of the Formula 4 with 8 parts of acrylonitrile and 1.5 parts of vinylacetate, a solution of a copolymer is obtained in a yield of 93% of polymer.

Example 19

1 part of the compound of the Formula 4 is dissolved with the aid of 4 parts of 2 N-sulphuric acid in a solution of 1 part of lauroyl amidopropyl trimethylammonium methosulphate and 2 parts of N-diethylamino-propylacrylamide (quaternated with chloracetamide) in 51 parts of water. Then 17 parts of acrylic acid ethyl ester are added and while stirring the mixture and passing nitrogen through it, it is heated to 50° C., and a solution of 0.1 part of potassium peroxydisulphate in 4.5 parts of water and a solution of 0.04 part of sodium metabisulphite in 2.5 parts of water are added. After 30 minutes a solution of 0.1 part of potassium peroxydisulphate in 4.5 parts of water and after another 30 minutes a solution of 0.04 part of sodium metabisulphite in 2.5 parts of water are added, and the batch is polymerized for 4 hours at 60° C., to yield 90 parts of a film-forming, fine dispersion having a resin dry content of 23%, corresponding to a polymer yield of 97%.

Example 20

When in the process of Example 19 the 17 parts of acrylic acid ethyl ester are replaced by 13 parts of acrylic acid ethyl ester and 4 parts of styrene, a film-forming, fine dispersion is likewise obtained which has a resin dry content of 21%, corresponding to a polymer yield of 94.5%.

Example 21

0.4 part of the compound of the Formula 4 is dissolved with the aid of 2.15 parts of 2 N-sodium hydroxide solution in a solution of 1 part of sodium lauroylsulphate in 49 parts of water. Then 15.6 parts of acrylic acid ethyl ester and 4 parts of vinylidenechloride are added and the whole is stirred under nitrogen while being heated to 40° C., whereupon a solution of 0.1 part of potassium peroxydisulphate in 4 parts of water and a solution of 0.04 part of sodium metabisulphite in 2.5 parts of water are added. 30 minutes later a solution of 0.1 part of potassium peroxydisulphate in 4.5 parts of water and after another 30 minutes a solution of 0.04 part of sodium metabisulphite in 2.5 parts of water are added, and the batch is polymerized for 4 hours at 60° C. Yield: 84 parts of a film-forming, fine dispersion having a resin dry content of 23%, corresponding to a polymer yield of 91%.

Example 22

A solution of 3 parts of the compound of the Formula 6 and 0.06 part of azo-diisobutyronitrile in 10 parts of dimethylformamide is heated to 85° C. with stirring and while passing a current of nitrogen. 12 hours later a solution of 0.06 part of azo-diisobutyronitrile in 3 parts of dimethylformamide and after another 7 hours a solution of 0.03 part of azo-diisobutyronitrile in 1.5 parts of dimethylformamide are added, and the solution is heated for another 30 hours at 85° C. The solvent is distilled off under a vacuum and there are obtained 3 parts of the homopolymer which forms a clear, brownish yellow film.

Example 23

When 3 parts of the compound of the Formula 4, 5 or 7 are polymerized as described in Example 22, a film-forming homopolymer is likewise obtained.

Example 24

1:1-COPPER COMPLEX (MOLECULAR RATIO COMPLEX FORMER: CUPRIC CHLORIDE=1:1)

A stirred solution of 3 parts of the copolymer obtained in Example 5 in 30 parts of water is mixed with sufficient 2 N-hydrochloric acid to dissolve all. Then 4 parts of aqueous cupric chloride of 10% strength are added, the mixture is stirred for 5 minutes and poured into 250 parts of isopropanol, whereupon the copolymer settles out in the form of the copper complex. The green, floccular precipitate is suctioned off, washed with a mixture of 80 parts of isopropanol and 20 parts of water, and dried, to yield 3 parts of the polymeric copper complex which is soluble in water.

*Analysis.*—Cu; calculated, 9.32%; found, 9.4%.

Example 25

2:1-COPPER COMPLEX (MOLECULAR RATIO COMPLEX FORMER: COPPER ACETATE=2:1)

A solution of 6.1 parts of the copolymer obtained in Example 6 in 50 parts of dimethylformamide is poured into a solution of 2.5 parts of cupric acetate in 47.5 parts of dimethylformamide, and the mixture is stirred for 15 minutes. By addition of 150 parts of water the copolymer is precipitated as the copper complex, suctioned off, washed with water until copper ions can no longer be detected in the filtrate, and dried.

Example 26

1:1-TIN COMPLEX (MOLECULAR RATIO COMPLEX FORMER: TRIBUTYL TIN ACETATE=1:1)

A solution of 6 parts of the copolymer obtained in Example 6 in 24 parts of dimethylformamide and 8 parts of benzene is poured into a solution of 3.57 parts of tributyl tin acetate in 12 parts of dimethylformamide. The solution is concentrated under vacuum. The copolymer is precipitated with 150 parts of water as the tin complex, suctioned off, washed and dried. It is readily soluble in dioctylphthalate.

Example 27

1:1-MERCURY COMPLEX (MOLECULAR RATIO COMPLEX FORMER: PHENYL MERCURIC ACETATE=1:1)

By using as complex former a solution of 3.44 parts of phenyl mercuric acetate in 20 parts of dimethylformamide and proceeding as described in Example 26, the mercury complex of the copolymer is obtained in identical manner; it is soluble, for example, in dioctylphthalate.

Example 28

1:1-TIN COMPLEX

A solution of 8 parts of the copolymer obtained in Example 7 in 20 parts of dimethylformamide is stirred into a solution of 4 parts of tributyl tin acetate in 20 parts of dimethylformamide. The copolymer is precipitated as the tin complex with 200 parts of water, suctioned off, washed and dried. It is of yellowish colour and dissolves readily in ethanol, acetone and dimethylformamide. Yield: 9.5 parts.

Example 29
1:1-MERCURY COMPLEX

A solution of 4 parts of the copolymer obtained according to Example 17 in 10 parts of dimethylformamide is stirred into a hot solution of 2.36 parts of phenyl mercuric acetate in 10 parts of dimethylformamide. After the batch has been allowed to stand for a short time, the copolymer is precipitated as the 1:1-mercury complex with 50 parts of ether, suctioned off, washed and dried. The product dissolves readily in water on addition of a dilute acid, for example acetic acid.

Example 30
1:1-TIN COMPLEX

A solution of 4 parts of the copolymer obtained in Example 17 in 10 parts of dimethylformamide is stirred into a hot solution of 2.45 parts of tributyl tin acetate in 10 parts of dimethylformamide. The batch is kept for a short time and then the copolymer is precipitated as the 1:1-tin complex by the addition of about 50 parts of ether, suctioned off, washed and dried. It dissolves readily in water on addition of a dilute acid, for example acetic acid.

Example 31
1:1-TIN COMPLEX

A solution of 2 parts of the copolymer obtained in Example 5 in 5 parts of dimethylformamide is stirred into a hot solution of 1.34 parts of tributyl tin acetate in 5 parts of dimethylformamide. The batch is kept for a short time and then the copolymer is precipitated as the 1:1-tin complex by adding 50 parts of ether, suctioned off, washed and dried. It dissolves readily in water on addition of a dilute acid, for example acetic acid.

Example 32
1:1-MERCURY COMPLEX

A solution of 2 parts of the copolymer obtained in Example 5 in 5 parts of dimethylformamide is stirred into a hot solution of 1.3 parts of phenyl mercuric acetate in 5 parts of dimethylformamide. The batch is kept for a short time and then the copolymer precipitated as the 1:1-mercury complex by adding 50 parts of ether, suctioned off, washed and dried. It dissolves readily in water on addition of a diluted acid, for example acetic acid.

Example 33

2 parts of the copolymer obtained in Example 4 are dissolved in 80 parts by volume of water with the aid of 5.6 parts by volume of N-hydrochloric acid, and the solution is buffered by slowly adding 2.6 parts by volume of N-sodium hydroxide solution. The whole is made up to 300 parts by volume with water. This solution is stable for a prolonged period of time (at least 24 hours); it is used for padding a cotton fabric which is then expressed to 100% (that is to say 1% of copolymer of Example 8, referred to the weight of the fabric, remains on the fabric). The fabric is then dried in air, padded with a 0.1% ammonium sulphate solution and once more expressed to 100%, and finally fixed for 10 minutes at 125° C.

The fabric thus treated is then metallized for 20 minutes at 20° C. in 10% solutions of the metal salts listed below (with the addition of 5 parts per 1000 parts by volume of a 25% aqueous solution of the reaction product of 1 mol of para-tertiary octylphenol with 8 mols of ethylene oxide to facilitate wetting) and then washed for 24 hours in running water of 29° C.

In an analogous manner the polymeric complex former of Example 1 (3 parts) dissolved in N-hydrochloric acid (2.4 parts by volume) is fixed on the fabric to an extent of 1% (referred to fabric weight), metallized and rinsed. In tests with cultures of *Aspergillus niger, Escherichia coli* and *Staphylococcus aureus* the fabric treated in this manner displays the following degree of surface infestation (in percent of the fabric surface) and inhibition zones (in mm.):

PRODUCT ACCORDING TO EXAMPLE 4

|  | Unmetallized, percent | Metallized with— | | | | | |
|---|---|---|---|---|---|---|---|
|  |  | $BaCl_2$, percent | $ZnCl_2$, percent | $Pb(acet.)_2$, percent | $CdCl_2$, percent | $HgCl_2$, mm. | $AgNO_3$, mm. |
| *Aspergillus niger* | 0 | 0 | 0 | 0 | 0 | 4 | (¹) |
| *Escherichia coli* |  |  |  |  |  | 2 | 2 |
| *Staphylococcus aureus* |  |  |  |  |  | 5.5 | 3 |

¹ 0 Percent.

PRODUCT ACCORDING TO EXAMPLE 1

|  | Unmetallized, percent | Metallized with— | | | | | |
|---|---|---|---|---|---|---|---|
|  |  | $BaCl_2$, percent | $ZnCl_2$, percent | $Pb(acet.)_2$, percent | $CdCl_2$, percent | $HgCl_2$, mm. | $AgNO_3$, mm. |
| *Aspergillus niger* | 0–25 | 0–25 | 0–25 | 0 | 0 | 9 | (¹) |
| *Escherichia coli* |  |  |  |  |  | 3 | 2 |
| *Staphylococcus aureus* |  |  |  |  |  | 5 | 2.5 |

¹ 0 Percent.

Example 34

2 parts of the copolymer obtained in Example 16 are dissolved in 200 parts of water with the aid of 1 part by volume of formic acid. This solution is padded on a cotton fabric which is then expressed to a weight increase of 100%, dried at room temperature and fixed for 10 minutes at 150° C.

The fabric treated in this manner is then metallized with solutions of metal salts as described in Example 33. In tests with fungus and bacterial cultures the fabric displays the following infestation or inhibition zones respectively:

|  | Metallized with— | | |
|---|---|---|---|
|  | $CdCl_2$, percent | $HgCl_2$, mm. | $AgNO_3$, mm. |
| *Aspergillus niger* | 0–25 | 10 | (¹) |
| *Escherichia coli* |  | 3 | 3 |
| *Staphylococcus aureus* |  | 4 | 3.5 |

¹ 0–25 percent.

Example 35

2 parts of the copolymer obtained in Example 1 are dissolved in 100 parts by volume of water with the aid of 0.1 part by volume of formic acid of 85% strength, and then 100 parts by volume of a 20% aqueous solution of the reaction product of 1 mol of melamine with 2.5 mols of formaldehyde are added. Then 0.2 part by volume of 85% formic acid is added as fixing catalyst and impregnated on the fabric at 20° C. to a weight increase of 100% on squeezing. The fabric is fixed wet at 60° C. for 4 hours. Metallization and washing are performed as described in Example 33.

The inhibition effects upon fungi are as follows:

ASPERGILLUS NIGER

Metallized with—
- $HgCl_2$ ———————————————— mm__ 5
- $AgNO_3$ ——————————————— percent__ 0
- $CdCl_2$ ———————————————— do____ 0

Example 36

MEASURING THE MINIMAL INHIBITORY CONCENTRATION (MIC) AGAINST BACTERIA AND FUNGI IN THE DILUTION TEST

The MIC (minimal inhibitory concentration) is determined by a test derived from the standard specifications, which produces an approximation to the absolute minimal inhibitory values of an active substance.

A solution of 1% and 0.3% strength each of the active substances in dimethylsulphoxide are introduced in small tubes containing sterile glucose broth (bacteria) and beer wort solution respectively (fungi), and with these solutions dilution series at $10x$ steps are prepared. By combining the two series the following continuous dilution series is obtained:

1000, 300, 100, 30, 10, 3 parts per million and so on.

The solutions are inoculated with the bacteria *Staphylococcus aureus* and *Escherichia coli* and with the fungi *Aspergillus niger* and *Rhizopus nigricans* respectively. Then, in the case of the bacteria, the solutions are incubated for 48 hours at 37° C. (bacteriostatic test) and in the case of the fungi for 72 hours at 25° C. (fungistatic test). After this incubation period the minimal inhibitory values in parts per million shown in the following table are found:

| Product of Example | Staphylococcus aureus | Escherichia coli | Aspergillus niger | Rhizopus nigricans |
|---|---|---|---|---|
| 31 | 10 | 100 | 30 | 10 |
| 32 | 1 | 10 | 10 | 10 |

What is claimed is:

1. A homopolymer from an 8-hydroxy-quinoline of the formula

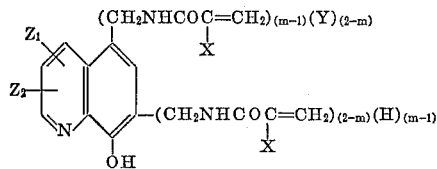

in which X represents a member selected from the group consisting of a hydrogen atom, a methyl group and an ethyl group, Y represents a member selected from the group consisting of a halogen atom and an alkyl radical of 1 to 4 carbon atoms, $Z_1$ and $Z_2$ each represents a member selected from the group consisting of a hydrogen atom and an alkyl group of 1 to 4 carbon atoms and $m$ represents a whole number of at the most 2, the homopolymer having a mean molecular weight within the range from 4000 to 20,000.

2. A copolymer from (a) an 8-hydroxy-quinoline of the formula

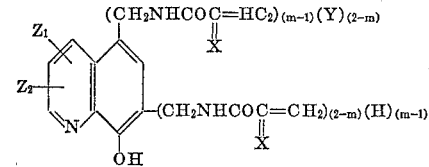

in which X represents a member selected from the group consisting of a hydrogen atom, a methyl group and an ethyl group, Y represents a member selected from the group consisting of a halogen atom and an alkyl radical of 1 to 4 carbon atoms, $Z_1$ and $Z_2$ each represents a member selected from the group consisting of a hydrogen atom and an alkyl group of 1 to 4 carbon atoms and $m$ represents a whole number of at the most 2, and (b) at least one other ethylenically unsaturated compound, the copolymer having a mean molecular weight within the range from 4000 to 20,000.

3. A copolymer according to claim 2 from (a) an 8-hydroxy-quinoline of the formula

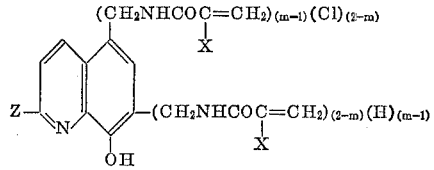

in which X and Z each represents a member selected from the group consisting of a hydrogen atom and a methyl group and $m$ represents a whole number of at the most 2, and (b) at least one other ethylenically unsaturated compound, the copolymer having a mean molecular weight within the range from 4000 to 20,000.

4. A copolymer according to claim 2 from (a) an 8-hydroxy-quinoline of the formula

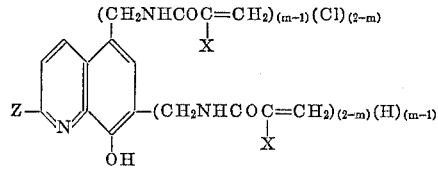

in which X and Z each represents a member selected from the group consisting of a hydrogen atom and a methyl group and $m$ represents a whole number of at the most 2, and (b) at least one other ethylenically unsaturated compound selected from the group consisting of acrylamide, N-tertiary butylacrylamide, methacrylic acid-n-octadecyl ester, methacrylamide-N-methylol methyl ether, methylene - N-acrylamide-N'-methanesulfonamide and methacrylic acid-dimethylaminoethylamide, the copolymer having a mean molecular weight within the range from 4000 to 20,000.

5. A metal complex compound of a homopolymer according to claim 1 from an 8-hydroxy-quinoline of the formula

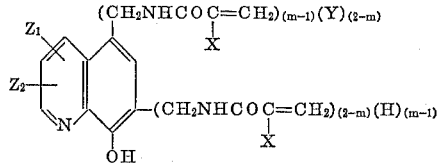

in which X represents a member selected from the group consisting of a hydrogen atom a methyl group and an ethyl group, Y represents a member selected from the group consisting of a halogen atom and an alkyl radical of 1 to 4 carbon atoms, $Z_1$ and $Z_2$ each represents a member selected from the group consisting of a hydrogen atom and an alkyl group of 1 to 4 carbon atoms and $m$ represents a whole number of at the most 2, the homopolymer having a mean molecular weight within the range from 4000 to 20,000, the complex forming cation being selected from the group consisting of $Mg^{2+}$, $Ba^{2+}$, $Zn^{2+}$, $Cd^{2+}$, $Hg^{2+}$, $Sn^{2+}$, $Pb^{2+}$, $Fe^{2+}$, $Cu^{2+}$, $Ag^{1+}$, tributyl-$Sn^{1+}$ and phenyl-$Hg^{1+}$, the cation being tied in with said homopolymer at the 8-hydroxy group and the ring nitrogen atom of the quinoline radical.

6. A metal complex of copolymer according to claim 2 from (a) an 8-hydroxy-quinoline of the formula

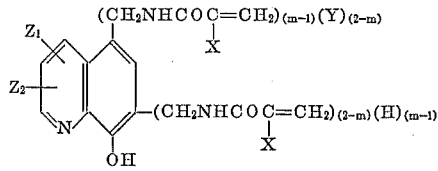

in which X represents a member selected from the group consisting of a hydrogen atom, a methyl group and an ethyl group, Y represents a member selected from the group consisting of a halogen atom and an alkyl radical of 1 to 4 carbon atoms, $Z_1$ and $Z_2$ each represents a member selected from the group consisting of a hydrogen atom and an alkyl group of 1 to 4 carbon atoms and $m$ represents a whole number of at the most 2, and (b) at least one other ethylenically unsaturated compound, the copolymer having a mean molecular weight within the range from 4000 to 20,000, the complex forming cation being selected from the group consisting of $Mf^{2+}$, $Ba^{2+}$, $Zn^{2+}$, $Cd^{2+}$, $Hg^{2+}$, $Sn^{2+}$, $Pb^{2+}$, $Fe^{2+}$, $Cu^{2+}$, $Ag^{1+}$, tributyl-$Sn^{1+}$ and phenyl-$Hg^{1+}$, the cation being tied in with said copolymer at the 8-hydroxy group and the ring nitrogen atom of the quinoline radical.

7. A metal complex compound of a copolymer according to claim 6 from (a) an 8-hydroxyquinoline of the formula

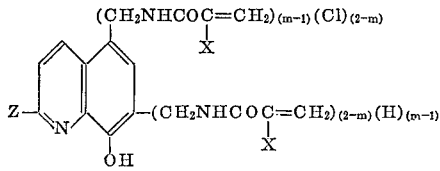

in which X and Z each represents a member selected from the group consisting of a hydrogen atom and a methyl group and $m$ represents a whole number of at the most 2, and (b) at least one other ethylenically unsaturated compound, the copolymer having a mean molecular weight within the range from 4000 to 20,000, the complex forming cation being selected from the group consisting of $Mg^{2+}$, $Ba^{2+}$, $Zn^{2+}$, $Cd^{2+}$, $Hg^{2+}$, $Sn^{2+}$, $Pb^{2+}$, $Fe^{2+}$, $Cu^{2+}$, $Ag^{1+}$, tributyl-$Sn^{1+}$ and phenyl-$Hg^{1+}$, the cation being tied in with said copolymer at the 8-hydroxy group and the ring nitrogen atom of the quinoline radical.

8. A metal complex compound of a copolymer according to claim 6 from (a) an 8-hydroxyquinoline of the formula

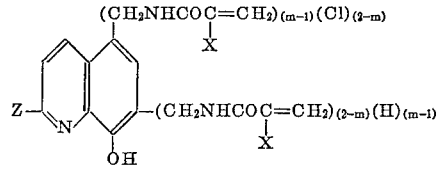

in which X and Z each represents a member selected from the group consisting of a hydrogen atom and a methyl group and $m$ represents a whole number of at the most 2, and (b) at least one other ethylenically unsaturated compound selected from the group consisting of acrylamide, N-tertiary butylacrylamide, methacrylic acid-n-octadecyl ester, methacrylamide-N-methylol methyl ether, methylene-N - acrylamide-N'-methanesulfonamide and methacrylic acid-dimethylaminoethylamide, the copolymer having a mean molecular weight within the range from 4000 to 20,000, the complex forming cation being selected from the group consisting of $Mg^{2+}$, $Ba^{2+}$, $Zn^{2+}$, $Cd^{2+}$, $Hg^{2+}$, $Sn^{2+}$, $Fe^{2+}$, $Cu^{2+}$, $Ag^{1+}$, tributyl-$Sn^{1+}$, and phenyl-$Hg^{1+}$, the cation being tied in with the said copolymer at the 8-hydroxy group and the ring nitrogen atom of the quinoline radical.

No references cited.

JOSEPH L. SCHOFER, *Primary Examiner.*

C. A. HENDERSON, *Assistant Examiner.*

UNITED STATES PATENT OFFICE
CERTIFICATE OF CORRECTION

Patent No. 3,391,114                                                 July 2, 1968

Paul Schaefer et al.

It is certified that error appears in the above identified patent and that said Letters Patent are hereby corrected as shown below:

Column 13, lines 60 to 68, the formula should appear as shown below:

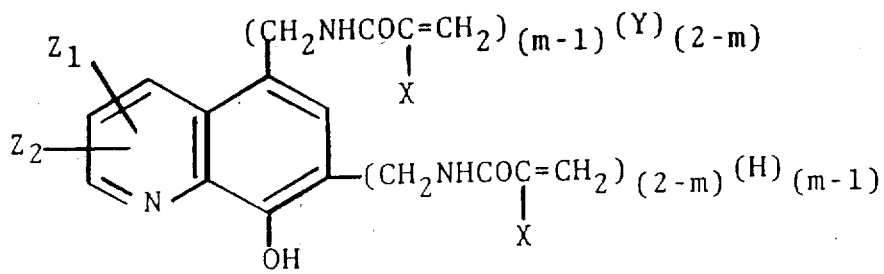

Column 15, line 11, "$Mf^{2+}$" should read -- $Mg^{2+}$ --.

Signed and sealed this 13th day of January 1970.

(SEAL)
Attest:

EDWARD M. FLETCHER, JR.                      WILLIAM E. SCHUYLER, JR.
Attesting Officer                                   Commissioner of Patents